United States Patent [19]
Thomas

[11] 3,752,439
[45] Aug. 14, 1973

[54] DAMPER ARRANGEMENT
[75] Inventor: John Thomas, Louisville, Ky.
[73] Assignee: American Air Filter Company, Inc., Jefferson County, Ky.
[22] Filed: Nov. 15, 1971
[21] Appl. No.: 198,748

[52] U.S. Cl. .................................. 251/121, 55/418
[51] Int. Cl. .............................................. F16k 47/00
[58] Field of Search .......................... 251/120, 121; 55/302, 417, 418

[56] References Cited
UNITED STATES PATENTS
2,951,499  9/1960  Singer ............................. 251/121 X
3,167,415  1/1965  Edwards ............................. 55/302
2,685,294  8/1954  Gold et al. ...................... 251/121 X
3,513,638  5/1970  Young ............................. 55/302 X
3,190,608  6/1965  Hassa ............................. 251/121
3,552,444  5/1951  Nielsen ........................... 251/121 X
3,019,809  2/1962  Ipsen et al. ...................... 55/417 X Primary Examiner—Henry T. Klinksiek
Attorney—Ralph B. Brick, Robert W. Fletcher et al.

[57] ABSTRACT

A damper arrangement wherein a damper blade opens and closes a flow through orifice and wherein a baffle means is provided which maintains an opening of constant cross section during a portion of the stroke of the damper blade to provide a buffered transition when removing a fluid system from or returning a system to full fluid flow.

10 Claims, 5 Drawing Figures

DAMPER ARRANGEMENT

BACKGROUND OF THE INVENTION

It is desirable to provide for a buffered transition when removing a fluid system from, or returning a fluid system to full fluid flow. For example, in the filtering of a gas stream using cloth fabric bags, it is desirable to avoid a sudden surge of fluid when a fluid controlling damper arrangement is activated since sudden surges of fluid may cause the fabric filter bags to snap and consequently weaken the fabric material and cause other undesirable results. This weakening of the fabric is particularly noticeable when the fabric material contains glass fibers as a component thereof. Prior art damper arrangements such as bullseye dampers and butterfly dampers can only be made to function satisfactorily by using expensive timed actuating means which cause them to operate very slowly. Even then butterfly dampers are particularly difficult to use because the fluid flow rate does not change linearly with respect to the change in position of the damper blade 11 but rather most of fluid control occurs when the damper blade is nearly parallel to the direction of fluid flow. Less objectionable is the bullseye damper since its flow rate changes linearly over the entire blade stroke. The present invention however, provides for a constant fluid flow rate during a predetermined portion of the blade stroke. Thus, the present invention provides a straightfoward, inexpensive, readily constructed and easily maintained damper arrangement to provide a selectively buffered transition in a system when stopping or starting fluid flow.

SUMMARY OF THE INVENTION

The present invention includes a damper arrangement which provides a constant flow of fluid therethrough during a portion of the blade stroke to effect a selectively buffered transition when starting or stopping fluid flow in a fluid system. More specifically the present invention provides a damper arrangement comprising: a plate having an orifice located therein; an orifice closing blade movably positioned between an open position and a closed position in relation to the orifice; actuating means for moving the blade relative to the plate orifice to open and closed position; and baffle means positioned in cooperative arrangement with the blade in spaced relation and orifice to provide a flow through opening of constant cross section during a predetermined portion of the blade stroke between its open and closed positions. The damper arrangement of this disclosure has been found to be particularlY useful where, for example, it is desirable to provide for the gentle inflation of a gas filter bag as it is being put onstream.

DESCRIPTION OF THE PREFERRED EMBODIMENT

Figure 1:
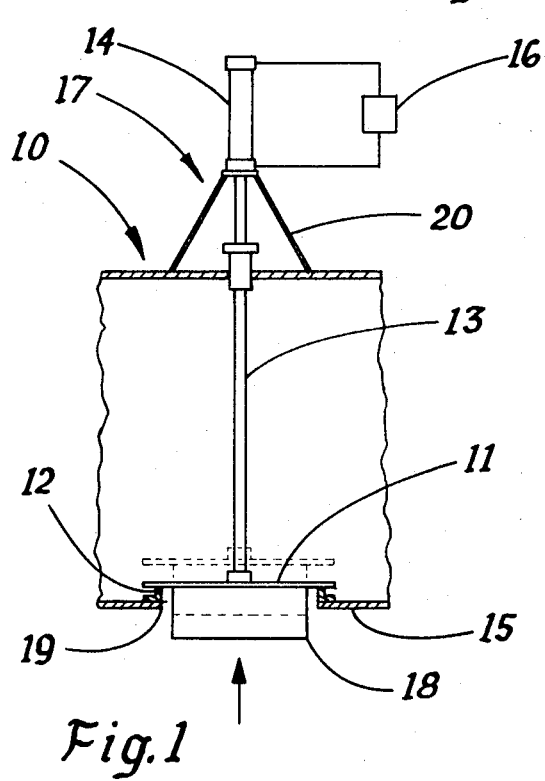
FIG. 1 is an elevational view, partially in cross section, of one embodiment of the invention of this disclosure.

In FIG. 1 damper arrangement 10 is shown in closed position having blade 11 in fluid tight relationship with seal 12 which surrounds orifice 19 in plate 15. Blade 11 is held in position and supported by actuating means 17 which includes shaft 13 connecting blade 11 to cylinder 14 and frame 20. Cylinder 14 is generally a hydraulic cylinder actuated by control means 16 and supported by support frame 20 outside of the fluid passageway. Control means 16 is generally a simple switch arrangement which may be selectively operated to open or close damper 10. Cylindrical projection 18 is attached on the orifice side of blade 11 to provide a fluid passageway of constant cross sectional area during a preselected portion of the stroke of blade 11. As can be seen from the dashed lines of FIG. 1, during a preselected portion of the blade stroke cylindrical projection 18 is passed through orifice 19 thereby defining an annular opening between its sidewall and orifice 19. Also, as can be seen from FIG. 1, during the initial stages of opening of damper arrangement 10, blade 11 will be moved upwardly from its fluid tight position on seal 12. As this happens cylindrical projection 18 remains in juxtaposition with orifice 19 and a constant flow of fluid will be allowed to pass through damper 10 between the annular space between the cylindrical projection 18 and the plate defining orifice 19. Cylindrical projection 18 therefore acts as a buffer which in effect provides for a smooth transition when, for example, cloth filter bags are being returned onstream after cleaning.

Preferably, orifice 19 and blade 11 are circular however, it is apparent that other shapes may be used. Correspondingly, cylindrical projection 18 is generally the same shape as blade 11 and orifice 19, but it is not imperative that such be the case. Additionally, it is preferable to have cylindrical projection 18 concentrically located with respect to orifice 19 which in turn indicates it would be centered with respect to blade 11. Again however, concentricity of cylindrical projection 18 with orifice 19 is not imperative and the apparatus of this invention will function acceptably even if cylindrical projection 18 is offset with respect to the center of blade 11 or orifice 19 or both. As can be seen in FIG. 1, cylindrical projection 18 is sized to pass through orifice 19. Also it should be noted that preferably the overall axial height of cylindrical projection 18 is equal to about one-fourth of the diameter of orifice 19. Such an axial height allows cylindrical projection 18 to be conveniently moved relative orifice 19, thus allowing damper arrangement 10 to be fully opened at the upward terminal position of cylinder 14. Damper arrangement 10 is considered to be fully opened when the lower edge of cylindrical porjection 18 is a distance above plate 15 equal to one-fourth of the diameter of orifice 19. Further, it is most preferred to have cylindrical projection 18 of a diameter which is in the range of about two-thirds of the diameter of orifice 19. In such a situation the clearance between the sidewall of the cylindrical projection 18 and orifice 19, will be in the range of about one-sixth of the diameter of orifice 19 on each side.

Figure 2:
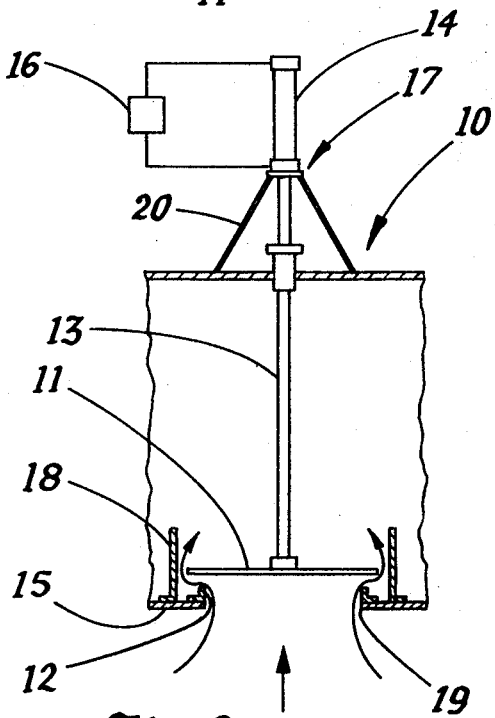
FIG. 2 is an elevational view, partially in cross section, of an alternative embodiment of the invention of this disclosure.

FIG. 2 shows an alternative embodiment of the invention of this disclosure which includes attaching cylindrical projection 18 onto orifice containing plate 15 in circumscribing relationship with orifice 19' and blade 11. As can be seen from FIG. 2 the operation of this damper is identical to the operation of the damper shown in FIG. 1; that is, blade 11 is drawn upwardly from seal 12 and passes axially inside of cylindrical projection 18. In such an arrangement the edges of blade 11 are in juxtaposition with the inside surface of cylindrical projection 18 during a selected portion of the blade stroke, and the flow through area defined by the edges of blade 11 and the inside surface of cylindrical projection 18 is constant, which allows a constant flow of fluid to pass therethrough. As in the embodiment of FIG. 1, the axial height of cylindrical projection 18 is preferably equal to one-fourth of the inside diameter of cylindrical projection 18. Also, the diameter of blade 11 is preferably in the range of about two-thirds of the inside diameter of cylindrical projection 18. A damper as shown in FIG. 2 is generally considered to be fully opened when blade 11 reaches a point above the upper edge of cylindrical projection 18 which is equal to one-fourth of the diameter of cylindrical projection 18. The damper of FIG. 2 is similar to the damper of FIG. 1 in that, generally it is preferred that orifice 19' and blade 11 be circular and be generally concentrically located with respect to each other and cylindrical projection 18.

Figure 3:
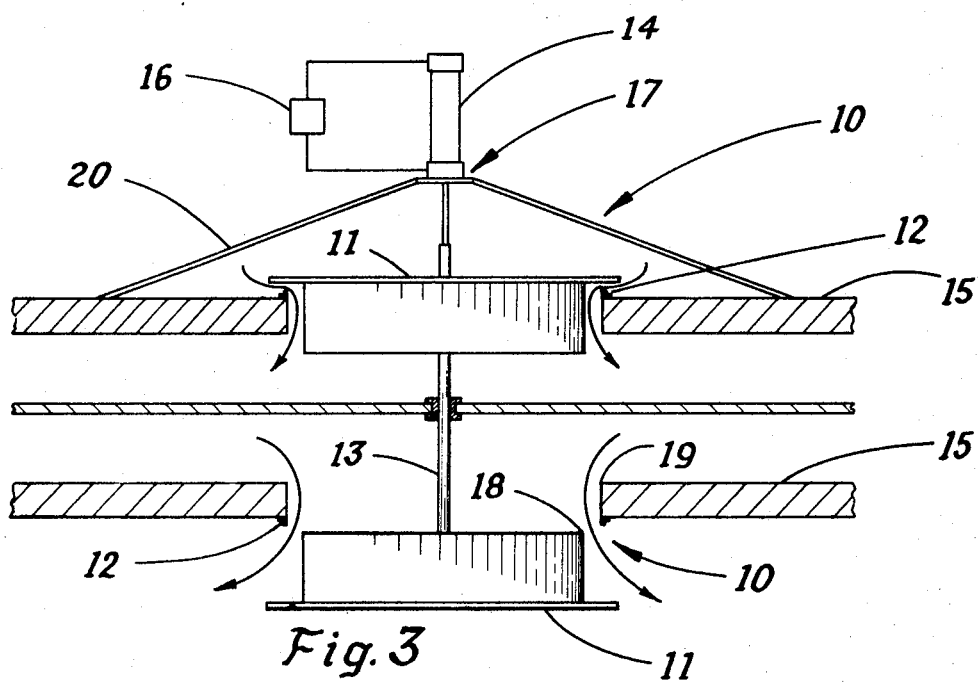
FIG. 3 is a schematic view of two damper arrangements of this disclosure in tandom.

In the embodiment shown in FIG. 1 it is of course possible to have shaft 13 located on the underside of blade 11. Then correspondingly cylinder 14 and frame 20 are located on the underside of blade 11 as well. This arrangement is perhaps less preferable in that the shaft 13, may obstruct the fluid flow through orifice 19. However, the function would be the same. Correspondingly then, it is also possible in the embodiment of FIG. 2 to have shaft 13 located on the underside of plate 14. Again such a situation may result in shaft 13, obstructing the fluid stream through orifice 19'. However, the function would be the same. It is also possible as shown in FIG. 3 to have two or more dampers arranged in tandem so that two individual streams may be simultaneously controlled. It is possible of course, depending upon the direction of flow, that one fluid stream of FIG. 3 would be in the process of being decreased while the other stream would be in the process of being increased. Alternatively, two fluid streams could simultaneously be decreased or increased with such a tandom arrangement. The suggestion of a tandem arrangement is also possible with the embodiment shown in FIG. 2.

Figure 4:
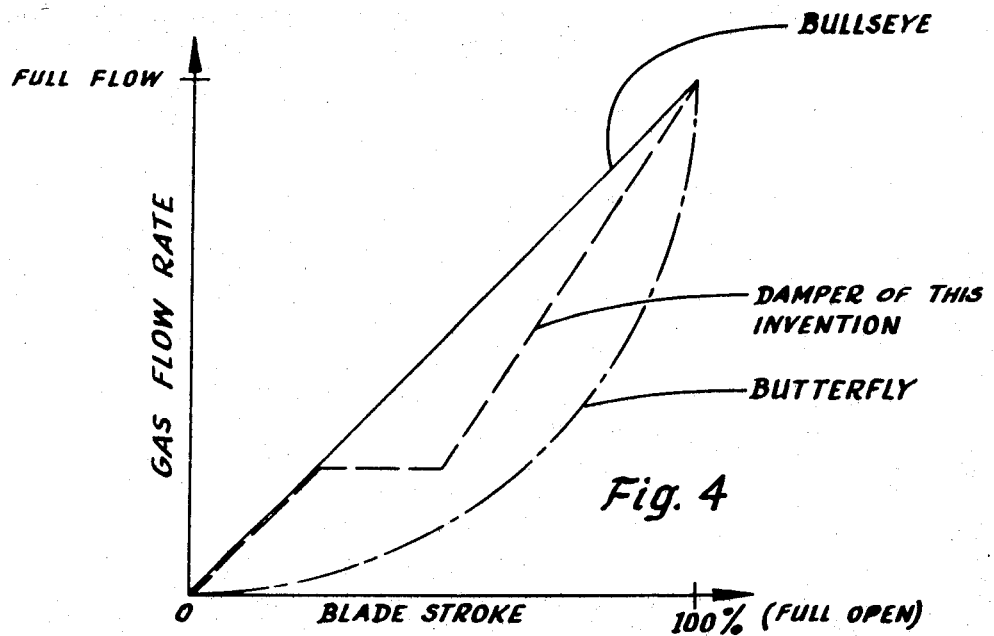
FIG. 4 is a graph showing the fluid flow rate through the damper of this invention compared to prior art dampers as a function of the position of the respective blades of the dampers.
Figure 5:
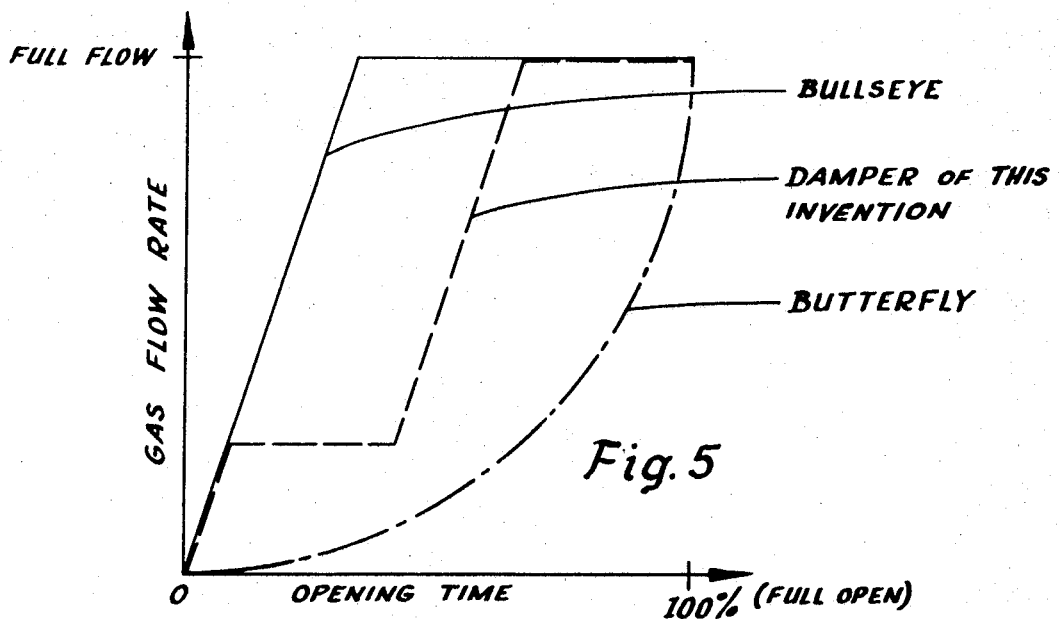
FIG. 5 is a graph showing the fluid flow rate through the damper of this invention compared to prior art dampers as a function of the respective opening times of the dampers.

FIGS. 4 and 5 show the performance of the damper arrangement of this invention as compared to prior art dampers. In FIG. 4 the fluid flow rate of the embodiment of FIG. 1 is shown as a function of the blade position above plate 15. The increase in fluid flow rate is linear until the distance between blade 11 and plate 15 is equal to the distance between cylindrical projection 18 and the orifice 19. At this point as blade 11 is continuously removed from plate 15, the distance between cylindrical projection 18 and orifice 19 is constant and controls the fluid flow rate. This cross-sectional area continues to control the fluid flow rate until the lowermost edge of cylindrical projection 18 is in a common plane with orifice 19. At this point in the opening of damper 10 the fluid flow rate increases linearly until the damper is fully opened.

FIG. 5 shows the flow rate of fluid through the damper arrangement 10 shown in FIG. 1 as a function of the opening time. The initial fluid flow rate increases linearly until elapse of the time required for blade 11 to move from plate 15 a distance equal to the distance between the orifice 19 and the sidewall of cylindrical projection 18. From this time on the controlling flow through area becomes the cross-sectional area between orifice 19 and cylindrical projection 18. This cross-sectional area continues to control the fluid flow until the time required for the lowermost edge of cylindrical projection 18 to move into a common plane with orifice 19 has elapsed. From this time on the fluid flow rate increases linearly until the damper arrangement is fully opened.

FIGS. 4 and 5 represent the flow rate as a function of blade position and opening time, respectively, for the embodiment shown in FIG. 2 as well. It is important to note that in closing the damper arrangements shown in FIGS. 1 and 2 exactly the same flow rate changes are observed but in reverse; that is, for example, considering the damper arrangement of FIG. 1, as the lowermost edge of cylindrical projection 18 approaches orifice 19 and arrives at a distance equal to one-fourth of the diameter of orifice 19, the flow rate of fluid therethrough linearly decreases until the lowermost edge of cylindrical projection 18 is in a common plane with orifice 19. At that point the flow rate becomes constant until blade 11 approaches within a distance which is equal to the distance between the outer edge of orifice 19 and the sidewall of cylindrical projection 18. Then the flow rate decreases linearly until blade 11 comes to rest upon seal 12. Thus, the tandem arrangement shown in FIG. 3 allows for the simultaneous opening and closing of the dampers in such a manner that the flow rate of two separate fluids may be simultaneously controlled with the flow rate of one being increased while the other is decreased. It is also Possible to have an overlap Inthe selective buffering of two fluid flow rates, for example, in the cleaning of cloth fabric dust filter bags, where the dirty gas flow is decreased and a vacuum is drawn on the filter bags to cause them to collapse to allow caked accumulations to drop therefrom, it may be desirable to employ the invention of this disclosure in tandem to effect a gentle decrease of the dirty gas stream and simultaneously effect a gentle increase in the vacuum applied to the bags. In such a situation snapping of the bags and weakening of the cloth fibers is avoided. Then, when the direction of the tandem dampers is reversed the vacuum is gently decreased and the filter bags are gently again put onstream.

Having thus described the invention what is claimed is:

1. A damper arrangement comprising: a plate having an orifice located therein; an orifice closing blade movably positioned between an open position and a closed position in relation to said orifice; actuating means for moving said blade relative to said plate; and baffle means positioned in cooperative arrangement with said blade and said orifice to provide a flow through opening defined by the edge of said orifice and said baffle means of constant cross section during a predetermined time period during the blade movement.

2. The apparatus of claim 1 wherein said baffle means is attached to said blade and is circumscribed by said orifice.

3. The apparatus of claim 2 wherein said orifice is generally circular and said baffle means is a generally cylindrical projection of smaller diameter than said orifice and spaced generally concentrically to said orifice.

4. The apparatus of claim 3 wherein said generally cylindrical projection is of an axial length of about one fourth of said orifice diameter.

5. The apparatus of claim 4 wherein said generally cylindrical projection is of a diameter in the range of about two thirds of the diameter of said orifice.

6. The apparatus of claim 5 wherein said generally cylindrical projection is of such length that it is at least a distance equal to one fourth of the diameter of said orifice from said orifice when said blade is in its open position.

7. The apparatus of claim 1 wherein said baffle means is attached to said plate and circumscribes said blade in its closed position.

8. The apparatus of claim 7 wherein said orifice and said blade are circular and said baffle means is a generally cylindrical projection attached to said plate and spaced generally concentrically with respect to said orifice and said blade.

9. The apparatus of claim 8 wherein said generally cylindrical projection is of an axial eight equal to about one fourth of said orifice diameter.

10. The apparatus of claim 9 wherein said generally cylindrically shaped portion is of a diameter in the range of about 1.33 times the diameter of said blade.

* * * * *